Feb. 5, 1946. W. C. MACEY Re. 22,716
SAMPLE DISPLAY BOOK
Original Filed Jan. 24, 1940
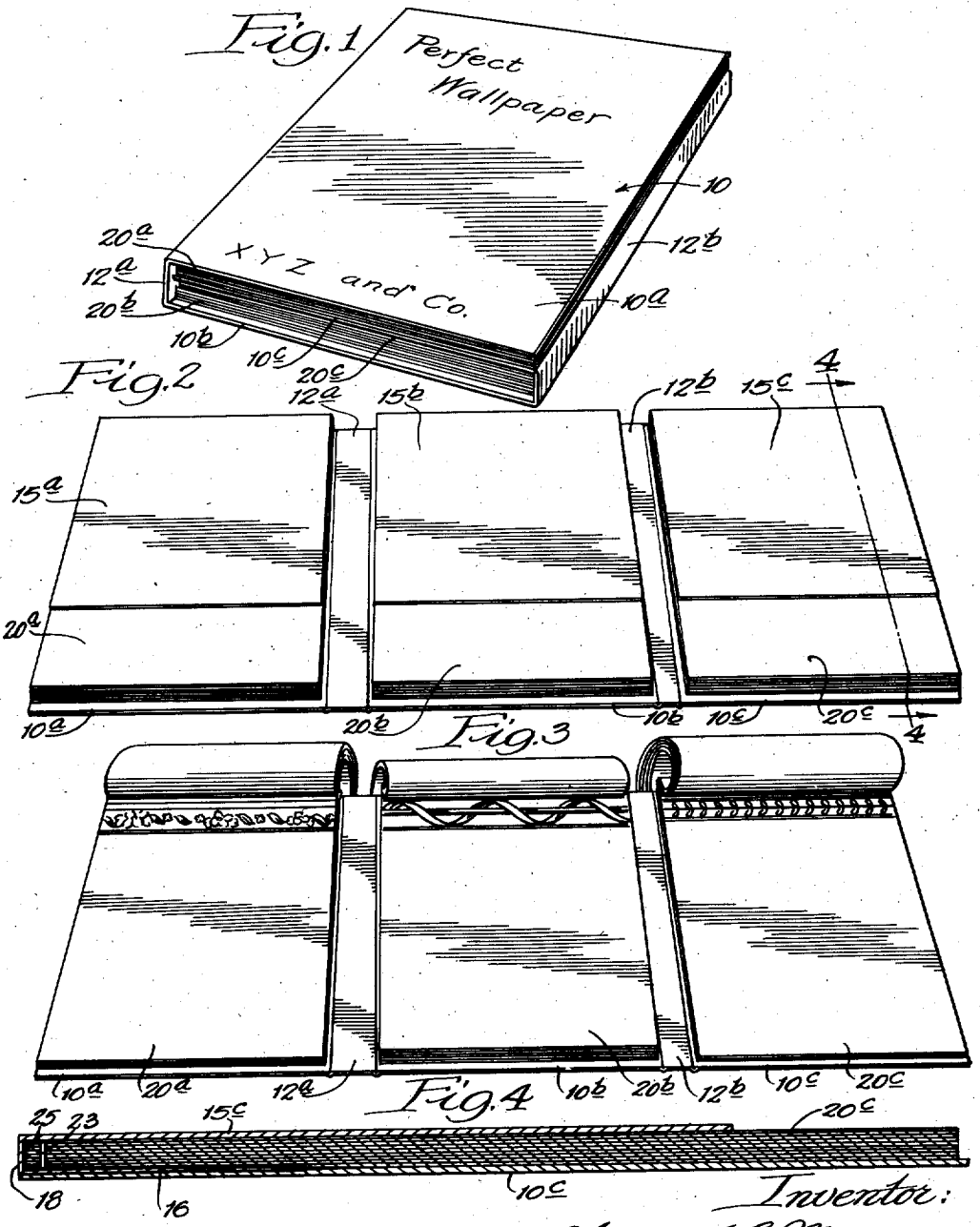
Inventor:
William C. Macey,
By Frank H. Marks,
Attorney.

Reissued Feb. 5, 1946

Re. 22,716

UNITED STATES PATENT OFFICE 22,716

SAMPLE DISPLAY BOOKS

William C. Macey, Winnetka, Ill., assignor to Sears, Roebuck and Co., Chicago, Ill., a corporation of New York Original No. 2,258,418, dated October 7, 1941, Serial No. 315,335, January 24, 1940. Application for reissue June 17, 1943, Serial No. 491,249

5 Claims. (Cl. 35—50)

My invention relates to improvements in book structures and has to do more particularly with books intended for the display of samples of sheet material, such as wallpaper, fabrics, and analogous materials.

A particular object of my invention is to provide a book of the character described which is divided into a plurality of sections, said sections being bound and arranged in such a manner that the elements thereof may, if desired, be displayed adjacent each other for purposes of comparison.

Another object is to provide such a book which will be bound securely and inexpensively while preserving a neat and pleasing appearance.

Another object is to provide such a device which will be simple and inexpensive in construction, easily manipulated and, in general, thoroughly satisfactory for the purposes desired.

Various other objects and advantages will doubtless suggest themselves to those skilled in the art as the description proceeds.

Referring now to the drawing illustrating a further embodiment of my invention and forming a part of this specification:

Fig. 1 is a perspective view of a book embodying my invention in closed condition;

Fig. 2 is a similar view of such a book in open condition;

Fig. 3 is a similar view of the same showing more particularly the manner of use; and Fig. 4 is a sectional view taken substantially along the line 4—4 of Fig. 2.

The book illustrated in the drawing comprises a back or cover member indicated generally by the numeral 10, said cover being preferably formed of relatively stiff sheet or composite material, such as heavy cardboard, buckram, real or imitation leather, or the like, and consists of a plurality of sections 10a, 10b and 10c. Double parallel scoring is provided between said sections of the cover, as seen best in Figs. 2 and 3, to provide back strips 12a and 12b.

Secured to the inside of the cover sections 10a, 10b and 10c are generally U-shaped flap or fly elements 15a, 15b and 15c. Although, as seen in Fig. 4, the bottom sheet of each of the flies is shorter than the top sheet, this is merely a matter of convenience since the bottom sheet of the fly is preferably secured to the inside of the cover 10 by adhesive, as indicated at 16. As a matter of fact, this bottom sheet may be of any desired length sufficient to provide adequate attachment to the cover section. Each of the flaps or flies 15a, 15b and 15c is scored and folded to provide a back strip 18.

Secured within each of the flies 15a, 15b and 15c is a plurality of sheets forming independently bound book sections 20a, 20b and 20c. The sheets forming each of said book sections are preferably bound together by transverse elements 23, as seen in Fig. 4, which binding elements may be stitching, stapling, or other suitable devices known in the binding art, and each of said book sections is secured to one of the flies, preferably by means of adhesive 25 (Fig. 4) attaching the book section to back strip 18.

By binding the book sections 20a, 20b and 20c in the manner shown and described, it will be seen that the outside of the book as a whole is not marred by the appearance of any binding elements extending through the cover but presents a neat and attractive appearance.

The sheets forming the groups 20a, 20b and 20c may be of any suitable material adaptable to this invention. Thus, I have found my invention especially applicable for the display of wallpaper samples, as seen in Fig. 3, which samples may include a portion of the side wallpaper and a border section at the top. Obviously, other arrangements may be employed as, for example, showing a ceiling section on the same sheet with the wall as well as the border. Instead of wallpaper, the sheets may consist of swatches of fabric as, for example, material intended for use as draperies, upholstery, clothing, etc.

I have found my invention especially valuable, as stated above, in the display of wallpaper and, when so used, the various book sections 20a, 20b and 20c may have sheets of a different grade or quality. Also, each section may contain sheets of a certain type other than quality. For example, one section may contain samples of wallpaper, another of drapery fabrics, another of upholstery fabrics. Other combinations may suggest themselves.

Books embodying my invention are especially useful for simultaneously comparing samples of materials which are intended to be permanently disposed in relatively close physical or visual relation to each other. Thus, for example, one may wish to select wallpapers, drapes, etc. for three adjoining rooms as, for example, a living room, dining room and hall, etc. By examining a plurality of sheets simultaneously, for example, as shown in Fig. 3, a person may very conveniently select from the samples a plurality of materials which are either harmonious or provide a desired contrast in color or design, or other esthetic characteristic.

It will be understood that while I have shown as a preferred example a book having three sections, I do not consider myself restricted to this number but may use any convenient number of sections.

Various other changes and modifications coming within the spirit of my invention will doubtless suggest themselves to those skilled in the art and, hence, I do not wish to be restricted to the specific embodiment shown, except to the extent indicated in the appended claims.

I claim:

1. A book comprising a cover formed of a single sheet member forming a plurality of sections, each section having secured thereto a group of sheets, each sheet of each group having a plurality of visually different adjacent areas representing border and body designs of a wallpaper, the sheets of each group being connected together, and a U-shaped fly for each group and secured only by an intermediate portion thereof to an edge of the group, said fly having a portion independent of the sheet-connecting means and concealed by the bottom sheet of said group and adhesively secured to the inner side of one of said sections with said intermediate portion of each fly substantially flush with the same edge of said cover sheet member, each fly having a free portion hinged to said intermediate portion and having with said intermediate portion the appearance of a continuation of said cover sheet member, said hinged portion, when overlying its group, revealing one area and covering completely the other area of the associated top sheet, whereby the former areas of all top sheets may be examined together while the latter areas of said sheets are concealed.

2. A book comprising a cover formed of a single sheet member forming a plurality of sections, each section having secured thereto a group of sheets, each sheet of each group having a plurality of visually different adjacent areas, the sheets of each group being connected together, and a U-shaped fly for each group and secured only by an intermediate portion thereof to an edge of the group, said fly having a portion independent of the sheet-connecting means and concealed by the bottom sheet of said group and adhesively secured to the inner side of one of said sections with said intermediate portion of each fly substantially flush with the same edge of said cover sheet member, each fly having a free portion hinged to said intermediate portion and having with said intermediate portion the appearance of a continuation of said cover sheet member, said hinged portion, when overlying its group, revealing one area and covering completely the other area of the associated top sheet, whereby the former areas of all top sheets may be examined together while the latter areas of said sheets are concealed.

3. A book comprising a single sheet cover member having a plurality of interfoldable sections, each section having secured thereto a stacked group of sheets bearing different wallpaper designs, each design of each group bearing an esthetic relation to one or more of the designs of the other group or groups, and a U-shaped fly for each group, said fly being secured only by an intermediate portion thereof to an edge of the group, said fly having a portion concealed by the bottom sheet of said group and secured to the inner side of the associated section with said intermediate portion of each fly substantially flush with the same edge of said cover sheet member, each fly having a free portion hinged to said intermediate portion and adapted to overlie the associated group, said hinged portion having with said intermediate portion the appearance of a continuation of said cover sheet member, said hinged portion being movable to permit simultaneous examination of esthetically combinable designs on sheets of adjacent groups.

4. A book comprising a cover forming a plurality of sections, each section having secured thereto a group of sheets, said groups being spaced apart to render said book interfoldable to have an area approximating that of one of said groups, each sheet of each group having a plurality of visually different adjacent areas representing border and body designs of wallpaper, the designs on each sheet of each group being esthetically agreeable and simultaneously comparable visually with designs appearing on a selected sheet or sheets of the other group or groups, so that the observer may receive an impression of the appearance of the walls of adjoining rooms, the sheets of each group being connected together. and a U-shaped fly for each group, said fly having a portion concealed by the bottom sheet of said group and secured to one of said sections, said fly having a hinged free portion adapted to overlie said group, said portions being movable to positions revealing substantially the entire areas of only the body designs of selected sheets of said groups and concealing the border designs, and also being movable to reveal said border designs as well as said body designs.

5. A book comprising a single sheet cover member forming a plurality of sections adapted to lie flat on a table or other support, each section having secured thereto a group of sheets, said groups being spaced apart to render said sheet member interfoldable along lines between adjacent groups, each sheet of each group having a wallpaper design, the sheets of each group being connected together, and a U-shaped fly for each group, said fly being secured only by an intermediate portion thereof to an edge of the group, said fly having a portion independent of the sheet-connecting means and concealed by the bottom sheet of said group and adhesively secured to the inner side of the associated section with said intermediate portion of each fly substantially flush with the same edge of said cover sheet member, each fly having a free portion hinged to said intermediate portion and having with said intermediate portion the appearance of a continuation of said cover sheet member, the design on each sheet being esthetically agreeable with the design on a selected sheet of each of the other groups, said agreeable designs being simultaneously comparable to enable the observer to visualize how the walls of two or more adjoining rooms would appear, said hinged portions being movable to render the designs on said sheets simultaneously observable.

WILLIAM C. MACEY.